Nov. 8, 1966  L. V. BLACK ETAL  3,284,183
GLASS SHEET BENDING MOLD WITH PIVOTED END SECTIONS
Filed Oct. 21, 1965  3 Sheets-Sheet 1
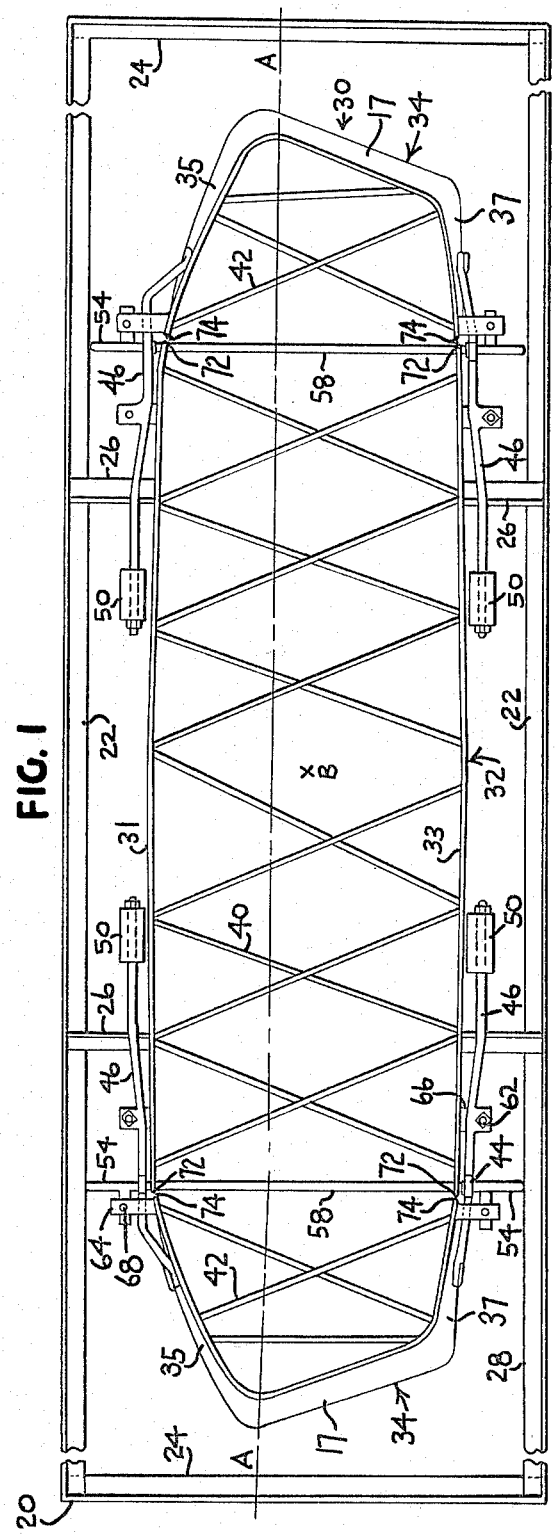
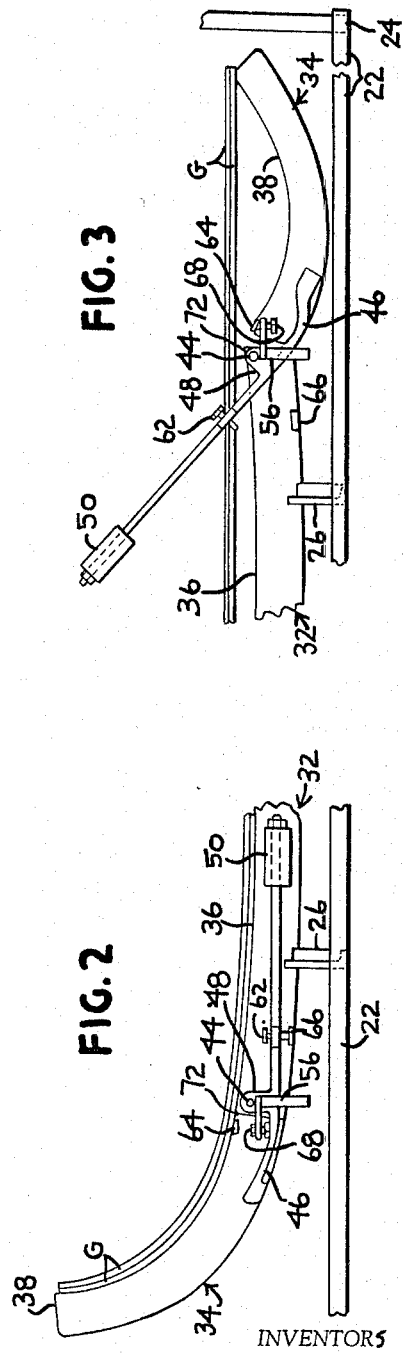
INVENTORS
LLOYD V. BLACK and
HAROLD E. McKELVEY
BY Chisholm and Spencer
ATTORNEYS

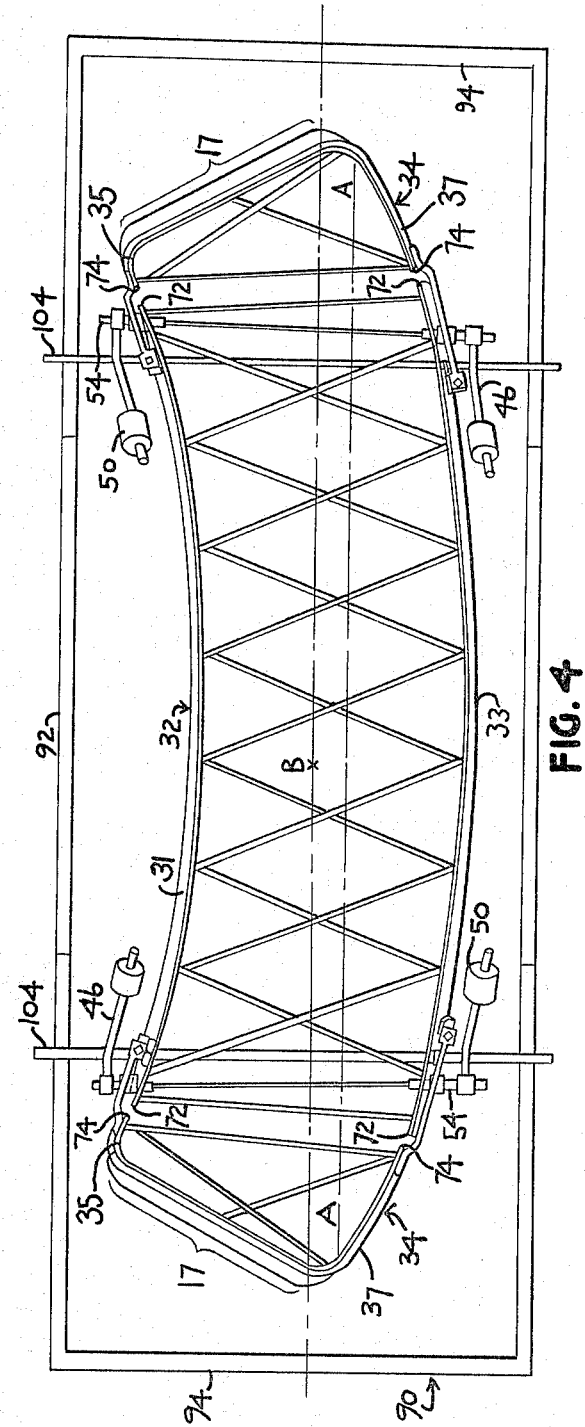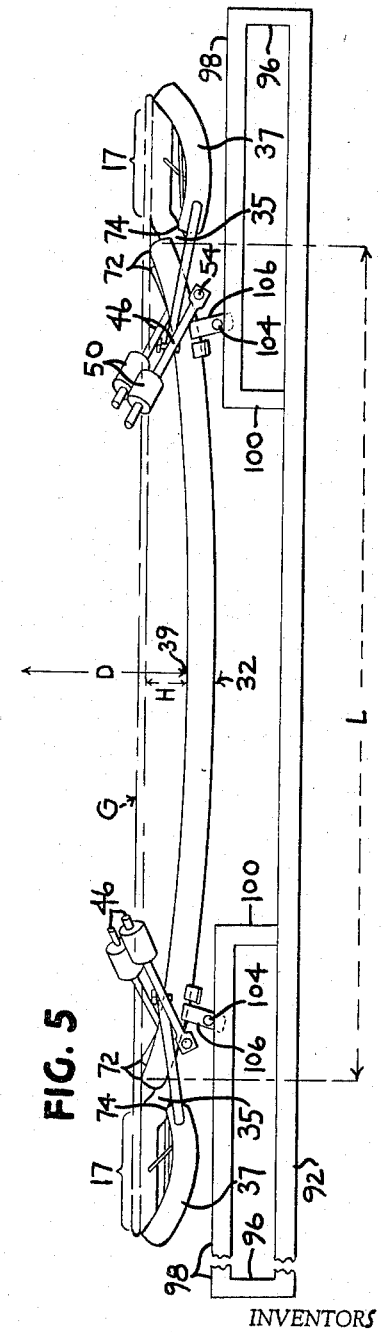

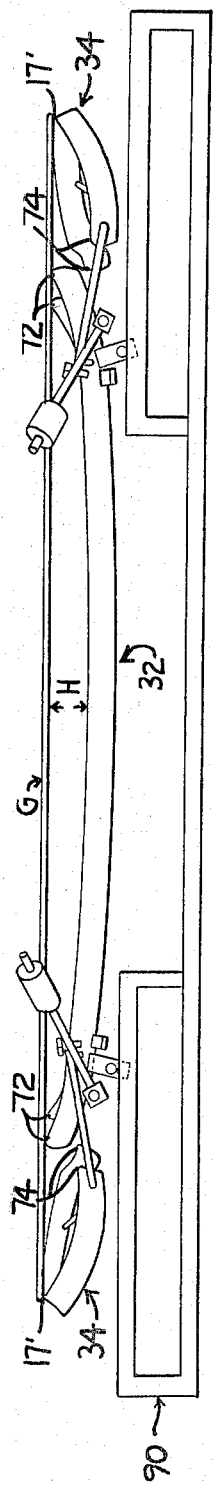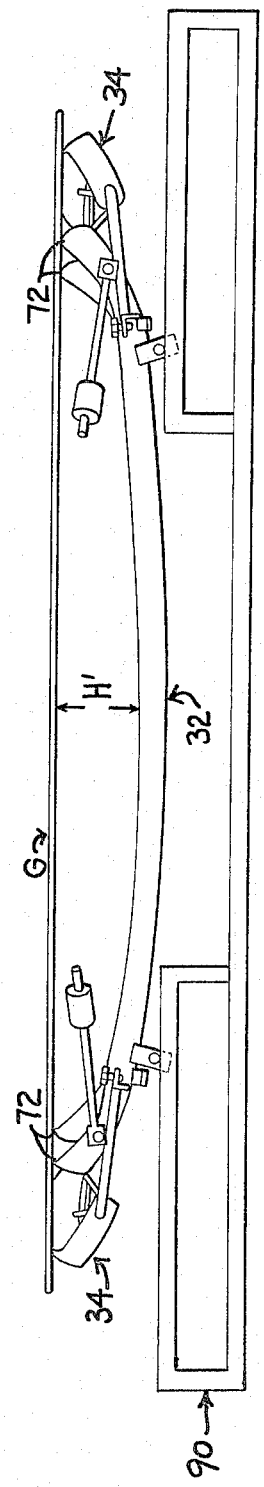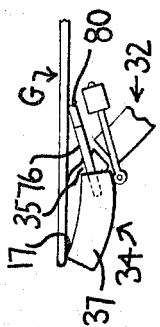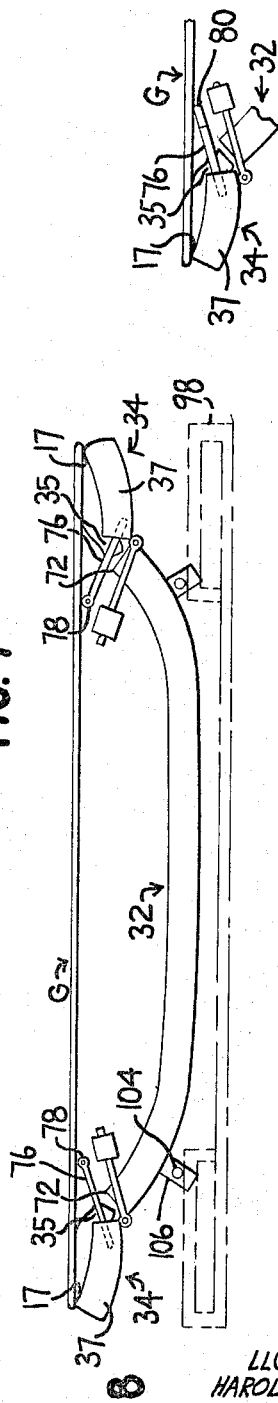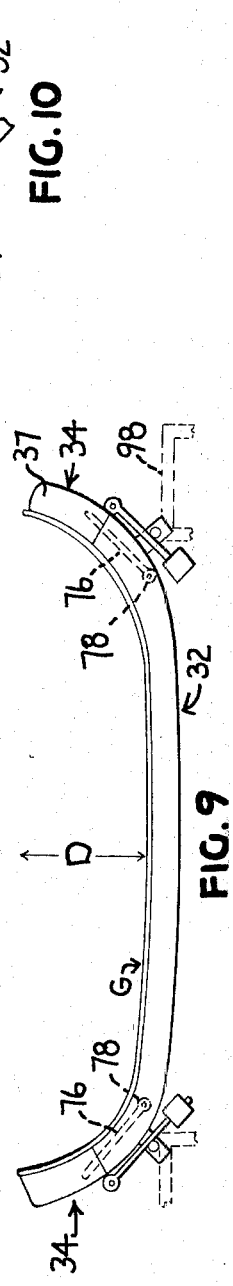

United States Patent Office 3,284,183
Patented Nov. 8, 1966

3,284,183
GLASS SHEET BENDING MOLD WITH
PIVOTED END SECTIONS
Lloyd V. Black, Murphy, N.C., and Harold E. McKelvey, Wayne County, Mich., assignors to Pittsburgh Plate Glass Company, Pittsburgh, Pa., a corporation of Pennsylvania
Filed Oct. 21, 1965, Ser. No. 499,675
6 Claims. (Cl. 65—291)

The present application is a continuation-in-part of application Serial No. 827,985 of Lloyd V. Black and Harold E. McKelvey, filed June 3, 1959 for Apparatus for Bending Glass, issued as U. S. Patent No. 3,248,199 on April 26, 1966, which, in turn, is a division of application Serial No. 438,011 of Lloyd V. Black and Harold E. McKelvey, filed June 21, 1954, for Method and Apparatus for Bending Glass and now abandoned after conversion into a sole application of Harold E. McKelvey.

This invention relates to an improved method and apparatus for bending glass, and specifically refers to improved bending molds of the female skeleton type otherwise known as peripheral-type molds of concave elevation designed especially for bending glass to complex shapes. The molds described herein impart a comparatively shallow bend to a main portion located centrally of the glass sheets. These shallow bends merge into intermediate portions where the radius of curvature of the bends diminishes rapidly. The longitudinal end portions of the glass are bent to such a degree that the tangent to the surface of the bent glass is rotated on the order of 90 degrees from the tangent to the center of the glass. In addition, the opposed lateral edges of the glass longitudinal end portions may be bent to different degrees of curvature, thus imparting a conical bend in these regions. The present invention also is useful in bending glass sheets to a shape wherein only one end of a main portion is bent to form an intermediate portion that is sharply bent and a longitudinal end portion bent relative to said main portion about said sharply bent intermediate portion.

Glass bending molds comprising a center section and spaced opposing wing or end sections, each located at either longitudinal extremity of the center section, each pivotable with respect to the center section about an axis to a spread position to support a flat sheet of glass spanning the mold and rotatable into a closed position providing a continuous skeletonized surface having the desired contour of the bent glass are well known, as seen in Patent No. 2,330,349 to Henry J. Galey. In such molds, the wing sections are counterweighted to produce bending moments tending to rotate the wing sections from the spread position to a closed position. The distance between the outer ends of the end mold sections measured along a straight line in the open mold position is substantially equal to the curved length of the mold measured between the outer ends of the end mold sections in the closed mold position.

Such molds were developed initially for bending relatively small sheets of glass into comparatively shallow cylindrical curves. Today, the requirements of automobile manufacturers demand larger sheets of glass shaped to very complex bends. These additional requirements bring out certain latent deficiencies in bending molds of the type previously acceptable, unless certain additional precautions not required previously are taken.

According to the prior art, bending of glass sheets is accomplished by heating flat glass sheets supported between stop members located at the extremities of the wing sections of the mold. Heat is applied to the glass, the glass softens, and the bending moments supplied by the weights close the mold, the heat softened glass moving to conform to the continuous skeleton structure resulting from closing the mold by a combination of heat sagging and force applied to the glass extremities via the stop members. The entire glass sheet is slid into alignment with the closing mold.

Unless both ends of the flat glass sheets sag and slide equally during the bending operation, the sheet may get out of alignment with the mold. In cases where it is desired to bend small glass sheets into cylindrical curves, any misalignment due to unequal sagging or unequal sliding, or both, does not affect the curvature of the finished product materially. However, when bending to complex curvatures is desired, any misalignment of the glass due to non-uniform sliding of the glass relative to the mold as the mold moves from open to closed position results in the formation of undesired curvatures in the glass due to the difference in size of the extremities of the misaligned glass. This error in curvature is magnified with larger sheets and more complex curvatures.

Prior to recent design changes in automobile windshields and backlights, the location of the hinges upon which the wing sections rotate relative to the center section and of the boundaries between the wing sections and the center section of the glass sheet bending molds was not important. The distance that a flat glass sheet is required to sag by gravity to conform to the mold shaping surface of concave elevation, even in its central portion where the sagging is at a maximum, is not critical for bending small sheets of glass to comparatively shallow cylindrical curves. When larger sheets are shaped to complex bends, this problem becomes considerable. The higher the flat glass sheet is placed relative to the central portion of the mold, the greater is the relative sliding between the glass and the mold. This sliding tends to develop marks in the heat softened glass.

An outstanding improvement afforded by the present invention is to provide criteria for locating the positions at which the wing sections are separated from the central mold section and to locate the hinges about which the wing portions may be rotated. With optimum positioning of the boundaries and the hinges, flat glass may be mounted upon the open mold in relatively close proximity to the upper surface of the central section. The location of the hinges about which the movable wing sections rotate from open to closed position of the mold is critical. These hinges must be located so that each wing section rotates into a position such that a transversely extending end portion thereof occupies a horizontal plane in the open mold position and, on rotating into the closed mold position provides a closing moment which lifts a longitudinal end portion of the softened glass sheet with a minimum of weight required, without elevating the initial position at which the flat glass must be placed upon the open mold.

Locating the flat glass sheet in close proximity to the central mold section enables the glass, when heated, to sag onto the latter with a minimum of relative sliding between the softened glass and the mold. The central portion of the glass becomes fixed in position relative to the central portion of the mold during the early stages of the bending cycle. The end portions of the softened glass are lifted upwardly by the rotation of the wing sections during the latter stages of bending, and relative movement tending to misalign the position of the glass sheet on the mold is minimized. Upward lifting of the extremities of the glass to final curved position while supported along a substantial portion of their transversely extending end portion combined with minimum sagging of the central portion of the glass produces minimum relative movement between the glass and the mold, further reducing sliding and misalignment.

The location of the boundaries between the wing sections and the center section is important. In bending flat glass sheets to curvatures having a relatively shallow bend at a central portion merging into areas where the radius of curvature diminishes rapidly to form extreme end portions in opposite planes substantially at right angles to the plane of the center portion, it is desirable to separate the wing portions from the main central portion in regions adjacent the regions of rapidly changing curvature and slightly inwardly thereof. The further from the optimum boundary points these separations are made, the higher the wing sections lie above the center section when the mold is opened. The closer to the center these boundaries are made, the greater is the possibility that large weights and moment arms will be needed to rotate the wing sections upwardly. Unless the boundaries are located inboard of the regions of rapidly changing curvature so that the plane of the mold surface at the boundaries is substantially parallel with the glass, the sharp corners of the boundaries dig into the heated glass to mar it, or else to cause kinks which may not be removable.

In addition, the hinges about which these wing sections rotate are so located that the extreme outer end of each wing section is in a horizontal plane which either intersects or is slightly above the plane defined by the extremities of the center section when the wing sections are rotated outward to the open mold position to support flat glass for bending. If the hinge locations are too far inside the extremities of the mold, an excessive amount of weight is required to close the wing sections of the mold. If the wing sections are pivoted about hinge axes that are outside of the optimum axes of positioning, the flat glass sets too high above the open mold.

If the hinge axes are located too low relative to the mold surface, the molds open too widely to support the length of the flat glass within the desired maximum vertical spacing between the flat glass and the upper surface of the center of the mold. Locating the hinges too high relative to the mold results in insufficient opening of the mold, thus causing the extremities of the flat glass to extend beyond the extremities of the open mold more than a desired maximum amount, a condition known as "overhang." In fact, when the mold is hinged above the flat galss surface, rotating shortens the mold, thus further increasing the overhang of the flat glass beyond the mold when mounted for bending.

Lessening the length of the moment arm of rotation of the wing sections about the hinge axes may lift the flat glass support plane in the open mold position. The length of the moment arm of the wing section is determined by both the horizontal and vertical positioning of the hinge relative to the wing section. Therefore, this factor must also be considered in determining the optimum hinge locations.

The upper limit of the hinge location is determined by the plane of the mold shaping surface. This limitation is determined by the necessity for subsequent tempering of certain sheets of glass after they are bent. When glass is tempered, the glass, while still supported on the mold in its bent position, is passed adjacent a plurality of movable nozzles which furnish blasts of air directed against the opposite surfaces of the bent glass sheet. If the hinges are located above the mold surface, they interfere with the freedom of movement of the tempering nozzles relative to the glass. This causes non-uniform tempering of the bent glass. To minimize this effect and also to lessen localized overheating due to the proximity to the supported glass sheet of the hinge rods and cross rods used to brace the mold, the rods are either thinned or offset from the glass intermediate the hinges and in the region facing the supported glass.

Another factor in determinging hinge locations is the peripheral contour of the sheet to be bent. Usually, glass sheets to be bent are non-symmetrical about the longitudinal axis of the flat glass sheet. Glass sheets having pointed extremities are supported by the mold at two extreme opposite points, one at each extremity. Glass sheets having relatively blunt straight-sided transverse end portions adjacent their longitudinal extremities are preferably supported along a line in a horizontal plane adjacent each extremity of the mold.

When the glass is bent about an axis extending normal to its longitudinal axis and supported at extreme points, the extremities of the glass can usually be bent about an axis extending normal to its longitudinal axis. A mold to produce such a bend can have its hinges located on an axis substantially perpendicular to the longitudinal axis of the mold supporting the flat glass sheet. Such hinges are referred to as cylindrical hinges.

Some patterns of sheets may required bending along axes of bending that are not perpendicular to the longitudinal axis of the flat glass sheet. Wing sections of sectionalized molds to produce such bends are pivoted to a center section about hinges disposed along an axis extending oblique to the longitudinal axis of the glass sheet. These latter hinges are referred to as conical hinges.

When a sheet of flat glass is laid upon a skeleton mold of concave elevation in the open position, the flat glass forms a span between the outer extremities of the wing portions of the mold. The increased size of windshields has provided such a long span between the mold extremities that the weight of the glass itself is sufficient in some cases to fracture the flat glass sheet spanning the mold. According to certain embodiments of the present invention, additional intermediate support points are provided on the mold to engage and support the undersurface of the flat glass as the latter is laid upon the open mold. These support means may comprise fixed inboard extensions of the wing sections which retract from engagement with the glass as the mold rotates from the open to the closed position upon heating and softening the glass sheet. In cases where the shape of the bend permits, the mold is preferably sectionalized and hinged in such a manner that the outboard extremities of the center section of the mold act as intermediate support points for the flat glass.

It is also possible that certain simpler glass bends can be obtained on a mold of the type described wherein the inboard extremities of the wing sections or arms operatively connected to the wing sections support the flat glass before bending. However, such alternate structures are less desirable than the preferred embodiment for producing complex bends because of the difficulty of obtaining an open mold position such that the flat glass sits low in the open mold on a horizontal plane.

Another benefit obtained from the provision of intermediate supports is to eliminate the tendency of the glass to pivot about a longitudinal axis substantially parallel with the span formed by the glass across the mold due to the fact that the center of gravity of the glass is outside the axis defined by the support points provided by the mold extremities. At least one intermediate support point is required to be on the opposite side of the center of gravity from the axis of support in order to preclude such transverse pivoting, which results in transverse misalignment and rejectable bends.

The glass is supported most securely throughout the bending operation when it is engaged adjacent both its longitudinal side edges by intermediate supports and also engaged along a substantial portion of its obliquely extending end portion that is lifted during its bending by a continuous line of support provided by the upper surface of an obliquely extending end portion of the wing section. Under such circumstances, the benefit of non-tilting support is provided both at the obliquely extending longitudinal end of the glass sheet and adjacent its longitudinally extending side edges. An additional benefit of minimizing overbending at the longitudinal end that would result from lifting the longitudinal end on a point of support also occurs when the longitudinal end portion of the glass is supported on a line of support rather than on a point of support. The line of support at one or both longitudinal ends of the glass extends in a horizontal plane obliquely to both sides of a longitudinal axis passing through the center of gravity of the glass. Thus, when the glass softens and sags toward the lowest portion of the concave shaping surface, its supported end to be bent is lifted on an elongated support. The continuous support provided at the ends of the glass lessens the possibility of glass misalignment relative to the mold shaping surface during the bending operation.

The size of the bending moments provided to close the mold is very important. These moments should be sufficiently small so that the weight of the glass upon the open mold more than compensates for the tendency of the moments to close the mold. As the glass and the mold are heated in a bending lehr, the heated glass sags to conform to the mold, especially its center portion, thus reducing the counterbalancing force of the weight of the glass. Toward the end of the bending operation when a large portion of the glass weight is supported on the central portion of the mold, the bending moments tending to close the mold operate to rotate the wing sections into closed position, thereby raising the end portions of the glass into conformity with the wings of the mold. Bending moments of the proper magnitude insure that the wings are closed at the proper phase of the bending cycle.

A primary object of the present invention is to provide an improved method and apparatus for bending glass to hitherto unattainable curvatures efficiently, especially glass sheets having dimensions greater than the maximum sizes previously bent.

An additional object of the present invention is to bend flat sheets of glass into curved shapes having a central major portion of curved contour of a relatively large radius merging into portions where the radius of curvature diminishes rapidly to form opposed edge portions in planes substantially perpendicular to the central major portion.

Another object of the present invention is to provide a female skeleton type of glass bending mold having a central section and movable wing sections rotatable into an open position to support flat sheets of glass at a minimum vertical distance above the central section and movable into a closed position providing a substantially continuous marginal surface having a contour conforming in plan and elevation to that desired for the bent glass sheet.

Yet another object of the present invention is to provide in a bending mold intermediate support means for supporting flat glass sheets whose length otherwise forms a span too long to resist fracture due to its own weight.

Still another object of the present invention is to provide an improved glass bending apparatus having a main section and one or more rotatable wing sections pivotable away from one or both ends of the main section respectively, to support a flat sheet of glass in a horizontal plane and pivotable toward the main section to help shape the glass to a contour formed by a substantially continuous surface provided on the upper surfaces of the sections when in juxtaposition to one another, and a method of bending glass utilizing such a mold wherein a flat sheet of glass is softened by heating and one or both longitudinal extremities of the heat softened sheet are lifted by rotation of the wing sections to conform to the mold.

Another object of the present invention is to provide a split skeleton mold of the type described provided with weighted lever arms providing moments tending to close the mold by lifting a small portion of the glass, but of a magnitude too small to overcome the entire weight of the glass to be bent.

Another object of the present invention is to provide a method of bending glass wherein a flat sheet of glass mounted on a split skeleton mold is softened by heating and one or both longitudinal extremities of the heat softened sheet are lifted by providing a lifting force to each longitudinal end portion of the glass to be bent at a plurality of points forming a line of support extending obliquely to both sides of a longitudinal axis extending through the center of gravity of the glass.

Still another object of the present invention is to provide a method and apparatus for bending flat glass into shapes wherein the longitudinal extremities of the glass are twisted relative to its center portion.

These and other objects will be apparent upon reading the following description of certain specific embodiments of various aspects of our invention, which embodiments are described for the purposes of illustration rather than limitation.

In the drawings, constituting a part of the description of the present invention:

FIGURE 1 is a plan view of one embodiment of the present invention;

FIGURE 2 is a side elevation view of one end of the mold shown in FIGURE 1 showing the mold in closed position;

FIGURE 3 is a side elevation view of the other side of the bending mold shown in FIGURE 1 depicting the mold in open position;

FIGURE 4 is a view similar to FIGURE 1 showing an alternate embodiment of the present invention;

FIGURE 5 is a side elevational view of the mold of FIGURE 4 in open position receiving a flat sheet of glass prior to bending;

FIGURES 6 and 7 are views similar to FIGURE 5 showing two disadvantages resulting from improper placement of the hinges and/or boundary points of a mold used to bend large sheets of glass to complex curvatures;

FIGURES 8 and 9 are elevational views of still another embodiment of the present invention showing a bending mold provided with retractable intermediate flat glass support means in the open and closed position respectively;

FIGURE 10 is a view similar to FIGURE 8 showing part of an end section of a mold provided with an alternate embodiment of an intermediate support means for supporting glass in accordance with the teachings of the present invention.

Referring to the drawings, reference number 20 depicts a mold carrying frame provided with a pair of spaced longitudinal side members 22 of L-shaped configuration and a pair of cross members 24 connecting the ends of the side members. The cross members also may be L-shaped in configuration for additional rigidity. A mold 30 comprising a main central section 32 and spaced end (wing) sections 34 is supported at its central section 32 by fixed attachment as by spot welding to intermediate transverse members 26 connected to the longitudinally extending members 22 of the mold supporting frame 20.

The main or center section 32 includes a first shaping rail 31 curved concavely in elevation and bowed outward in plan to conform to the outline of the central portion of one longitudinal side edge of the glass sheets supported for bending, and a second shaping rail 33 also curved concavely in elevation but substantially straight in plan to conform to the outline of the central portion of the other longitudinal side edge of the glass sheets supported for bending. Shaping rails 31 and 33 extend longitudinally of the mold 30 and are laterally spaced from and oppose one another to form the opposite longitudinal side edges of a peripheral-type shaping surface. Reference number 36 refers to the upper surfaces of the center section shaping rails and reference numbers 72 refer to the longitudinal ends of their upper shaping surfaces 36.

Each end section 34 comprises a shaping rail that includes an intermediate portion 17 extending obliquely of the mold and a pair of end portions 35 and 37 extending longitudinally inward from the opposite ends of the intermediate portion 17. The upper surfaces of the end section shaping rails are identified by reference character 38. Each end section shaping rail is generally U-shaped in plan with the obliquely extending intermediate portion 17 forming a substantial portion of the length thereof having a straight upper edge in elevation. The longitudinally extending end portions 35 and 37 are concavely curved in elevation to have their upper edges dip downwardly so that the inner longitudinal extremities 74 of surfaces 38 meet in aligned conformity with the adjacent ends 72 of the upper surfaces 36 of the center section shaping rails when the mold sections are in the closed mold position. The end sections 34 are movably joined to the opposite ends of the main section 32 for movement between an open position and a closed position.

The upper surfaces 36 of the shaping rails 31 and 33 of the main central section 32 and the upper surfaces 38 of the shaping rails of end sections 34 are shaped in plan and elevation to correspond to the contour desired for the corresponding portions of the bent glass sheet.

Transversely extending braces 40 interconnect the opposing shaping rails 31 and 33 of center section 32, while similar braces 42 interconnect the opposing longitudinal side portions 35 and 37 of the end sections 34 to improve the rigidity of the mold structure. These braces are preferably removed as far as possible from surfaces 36 and 38 in order to minimize localized heat variations to which adjacent portions of the glass sheet are subjected due to heat absorption and reradiation by the braces.

Preferably, the cross braces 40 and 42 should be disposed below the mold shaping surface a vertical distance at least 12 times the effective width (that is, the diameter of the cross-braces if they are rods or the width dimension parallel to the tangent to the shaping surface if the braces are in the form of bars). For example, rods of 1/8 inch diameter must be located at least 1½ inches below the shaping surface formed at the upper edge of the interconnected shaping rails.

In addition, the mold sections 32 and 34 may be serrated at the surfaces 36 and 38 respectively to provide passages for the escape of air blown against the glass during subsequent operations when the bent glass is tempered while supported on the mold.

The end mold sections 34 are pivoted about pivots 44. As shown in FIGURES 1, 2 and 3, lever arms 46 provided with ears 48 are fixed to the end sections 34 to provide a connection between members 34 and the hinge 44 at the ears 48. Each of the lever arms has a weight 50 at its inboard end.

In the embodiment shown in these figures, pivot rods 54 are fixed to the center section of the mold and provided with a depending portion 56 for supporting the central portion 58 of the hinge rod below the level of the mold shaping surface, thus increasing the distance between the hinge rod and the glass to minimize local heat shielding of the neighboring portions of the glass in the bending lehr. Suitable stop members 62 and 64 are provided to limit the opening and closing movement of the wing portions. Stop member 62 on the weighted lever arm 46 comes into engagement with flange 66 extending laterally outwardly from center mold section 32 to limit the closing movement of the wing sections 34. Stop members 64 abut adjustable stops 68 extending from the fixed hinge rod 54 to limit opening of the mold.

In operation, one or more flat sheets of glass G are mounted on the mold after the latter is placed in an open position. The glass and the mold are then conveyed into a bending lehr where the glass and the mold are gradually heated to prevent thermal shock. The glass is heated more intensely in the zones of more extreme bends. The glass, which was rigid while cold, softens upon the application of heat. The moments provided by the weighted moment arms 46 are thus enabled to rotate the wing or end sections 34, thus closing the mold to form a peripheral type shaping surface that is slightly smaller than the outline of the bent glass sheets in plan but conforms in elevation to the shape of the bottom surface of the bent glass. ThTe length of the mold measured along a straight line in the open mold position is substantially equal to the curved length of the mold in the closed mold position.

As the glass softens, it sags by gravity to conform to the central section 32 of the mold with a minimum of downward vertical displacement. The extremities of the softened glass are raised from their initial position shown in FIG. 3 to that shown in FIG. 2. As stated previously, this provision of a partial lifting and a partial sagging of the glass sheet due to its initial low position in the mold provides a minimum relative sliding between the mold and the glass.

Another important aspect of the present invention is the determination of the proper lifting moments to be applied to the longitudinal end portions of the heat softened glass. The bending moments provided by the weighted lever arms 46 should be too small to overcome the entire weight of the glass sheet, but should be large enough to overcome the weight of the extremities of the glass extending outwardly of points 72 at the extremities of the shaping rails of the center mold section 30. By providing the proper size moment arms, the glass is enabled to sag into partial conformity with the fixed center mold section before the wing sections begin to rotate to lift the extremities of the glass.

Proper bending moments can be provided by either increasing the size of the weights 50 or increasing the length of the lever arms 46. Too much mass of metal within the bending lehr impairs the efficiency of the bending operation since a greater proportion of the heat supplied by the bending lehr is utilized in heating the mold rather than glass. Therefore, care must be exercised in keeping the size of the weights 50 down to a minimum commensurate with the necessity for providing a bending moment of the proper magnitude and providing that the length of the lever arm 46 is not so great that it interferes with the placement of the flat glass sheets onto the mold before bending and removal of the bent glass sheets after bending. Undue length of the lever arms may also necessitate increasing the size of the bending lehr to such an extent that inefficient heating results.

As seen in FIGURES 1, 2 and 3, the hinge rods 54 traverse the mold in a plane perpendicular to the longitudinal axis of the mold. This provides a cylindrical rotation of the end or wing sections 34 relative to the center section 32. Except for very exceptional cases, each extremity of the flat glass sheet G is supported at a wing point at the extremity of the mold. For certain extreme shapes, where the longitudinal extremity of the mold is located adjacent one side thereof, such point support fails to provide adequate support for bending the extremities of the glass properly, because of the tendency of the glass to become kinked as will be explained in more detail below.

As seen in the embodiment shown in FIGS. 4 and 5, provision is made to open the mold so that the end sections 34 support the flat glass sheet longitudinal end portions along a line extending along the length of intermediate portion 17. This line of support is preferably chosen to be in the horizontal plane defined by the extremities 72 of the upper edges of the shaping rails 31 and 33 of the center mold section 32. Under such conditions, it usually becomes necessary for the hinge rods 54 to extend across the mold in a plane that is other than perpendicular to the longitudinal axis of the mold. Referring to FIG. 4, it is seen that the center portions 59 of the hinge rods 54 facing the glass are made thinner to raise the ratio of distance below shaping surface to effective width to at least 12 in order to minimize localized variations in glass heating due to absorption by the supported glass of heat reradiated from the hinge rods.

The frame member 90 shown in FIGURES 4 through 7 comprises longitudinally extending side members 92 interconnected by cross members 94 connecting the ends of the side members, vertically extending props 96 at each corner of the frame for supporting a plurality of mold support beams 98 which extend inwardly beyond the transverse lines defined by the extremities 72 of the shaping rails 31 and 33 of mold section 32. Additional vertical support rods 100 are provided to maintain the beams 98 substantially parallel with the longitudinally extending side members 92.

Transversely extending rods 104, which are secured in fixed relation to center section 32 of the bending mold 30 by means of support plates 106, are provided to load the bending mold on the beams 98 of the supporting frame 90. The hinge rods 54, 59 are located along an axis oblique to the longitudinal axis of the mold to provide a conical bend for the glass longitudinal end portions supported by the wings 34 rather than the cylindrical bend produced by the embodiment depicted in FIGS. 1, 2 and 3. The provision of conical type hinges permits the mold to open to the correct length, preferably about ½″ shorter than the length of the flat glass sheet, enables proper registry of the mold ends with the extremities of the flat glass, and provides proper support of the glass upon the center section of the mold, while enabling the glass to be carried comparatively low in the open mold, preferably not over 2½ inches separating the lower surface of the flat glass from the deepest portion 39 of the mold shaping surface. As seen in FIGURE 5, the flat glass is supported adjacent its longitudinal side edges at the extremities 72 of the shaping rails of the central mold section 32 and along the lines adjacent each longitudinal end portion of the glass along the obliquely extending end portion 17 of each wing section 34.

In FIGURE 6, a side elevation view similar to that of FIG. 5 shows how most glass sheets are supported in molds provided with cylindrical hinges when it is desired to use the extremities 72 of the center portion 32 as intermediate points of support for the flat glass in the open mold. Instead of supporting the glass extremities along a line extending along the length of the intermediate portion 17 as shown in FIGURES 4 and 5, the extremities of the glass are supported at a single point 17′. For some shapes of glass, this single point of support provides insufficient support for the glass extremities, thus allowing the glass to sag downwardly in a region in which it is desired to bend the glass upwardly. With certain extreme shapes, kinks are imparted to the glass extremities. Therefore, for certain shapes it is desirable to maintain a line contact rather than a point contact between the wing sections and the longitudinal end portions of the glass. On the other hand, for some glass shapes where this additional precaution is unnecessary, the use of cylindrical hinges is recommended because mold fabrication is less complicated when this precaution can be avoided.

FIGURE 7 is a side elevation of a mold such as depicted in FIGURES 4 and 5 wherein the mold is sectionalized and hinged at incorrect locations. Due to the incorrect boundaries, the angle formed between the extremity 72 of the mold section 32 and the bottom surface of the flat glass G is so great that the glass is easily marked as it softens and slides to conform to the mold. The large angle between the glass and the surfaces at points 72 make it more likely that one extremity of the glass is likely to slide faster than the other to cause the glass to shift longitudinally of the mold.

Since each extremity of the glass extends beyond the extremities of the wing sections 34 by more than the desired maximum amount due to insufficient opening of the mold because of improper hinging, the extremities of the glass tend to be bent downwardly by heat sagging rather than upwardly by lifting on the wing sections as desired. Furthermore, the improper location of the points of hinging and sectionalizing the mold results in the flat glass setting in a relatively high position compared to the shaping surfaces of the shaping rails of the central section 32 of the mold. This increases the tendency of the glass to be misaligned relative to the mold and also results in more than the desired amount of sliding action between the glass sheet and the mold as the glass is bent and the mold closed, since such glass positioning provides a minimum of upward lifting of the extremities of the glass sheet.

A mathematical criterion for the maximum height the flat glass is allowed to set above the open mold is expressed in terms of the depth D of the glass bend. H is required to be less than one-half of D, and preferably less than 25% of D. The desired bending cycle involving minimum central glass sagging combined with maximum possible lifting at the glass extremities results in minimum relative sliding between the glass and the mold when the glass to be bent to shallow central curvatures merging into extreme curvatures is supported on the open mold in closest possible adjacency to the deepest portion of the surface of the fixed central molding member.

Referring to FIGURES 8 and 9, still another embodiment is shown. In cases where the outboard extremities 72 of the center mold sections 32 do not provide intermediate support points for the flat glass, the intermediate support points may be provided by means of inwardly extending arms 76 fixed at each side to the inboard end of wing sections 34. A free running roller 78 is attached at the inboard end of each of the arms 76. The latter have a length and direction such that in the open mold position roller 78 contacts and supports the flat glass G adjacent the glass periphery at points spaced intermediate the ends of the open mold. The lateral location of the intermediate support points precludes tilting of the glass about axis A—A due to the location of the center of gravity B of irregularly shaped sheets G outside thereof, as seen in FIGURE 1. As the mold moves into the closing position to lift the transversely extending end portions of the glass supported along a line of support 17 upon rotation of the wing members 34, the arms 76 and the rollers 78 rotate with the wing members to retract from the undersurface of the glass.

The provision of ceramic rollers 78 at the end of each arm is not an absolute necessity. The ends of the arms may be provided with a covering 80 of a refractory material, such as asbestos or fiberglass cloth, to protect the undersurface of glass, as shown in FIGURE 10.

It is understood that the mold structure described in connection with the embodiment of FIGURES 4 and 5 may be used interchangeably with the mold supporting frame structure described in connection with the embodiment of FIGURES 1, 2 and 3. Also, it is understood that either the offset type of hinge rods or the hinge rods having central portions of reduced thickness may be used with any of the embodiments described herein.

Also, it is understood that the various intermediate support features such as the arms 76 and the points 72 may be utilized in combination with intermediate supports provided by the inboard extremities of one of the wing sections.

Various embodiments of apparatus capable of bending flat sheets of glass into various complex shapes by utilizing our novel principle have been presented. This principle involves utilizing a mold of such a structure that flat glass is placed in as low a position as possible in the mold to provide a minimum of vertical sagging and the extremities of the mold lift the extremities of the glass along a continuous line of support rather than on a point of support to shape the glass to that defined by the mold in closed position. The embodiments described illustrate

What is claimed is:

1. Apparatus for bending glass sheets to complex curvatures comprising a peripheral-type mold including a sectionalized shaping surface consisting of a center section and a pair of end sections movably joined to the opposite ends of said center section, said end sections being movable from an open position wherein a flat glass sheet is supported thereon to a closed position in which the bent sheet is received on all said sections, said center section including a pair of spaced, opposed shaping rails curved in elevation, one of said center section shaping rails being shaped in plan to correspond to the outline of the central portion of one longitudinal side edge of said glass sheet, the other of said center section shaping rails being shaped in plan to correspond to the outline of the central portion of the other longitudinal side edge of said glass sheet, each end mold section also including a shaping rail comprising an intermediate portion extending obliquely of the mold and a pair of end portions extending longitudinally inward from the opposite ends of the intermediate portion with the uppermost portion of said rail along a substantial portion of the rail length forming a straight line of support lying in a substantially horizontal plane when said mold sections are in the open position.

2. Apparatus as in claim 1, in which said center section shaping rails have upper surfaces concavely curved in elevation and further including means for supporting a flat glass sheet at spaced points adjacent its longitudinal side edges.

3. Apparatus as in claim 1, in which said end section shaping rails include portions at each of their ends which dip downwardly to meet in aligned conformity with the adjacent ends of said center section shaping rails when the mold sections are in said closed position.

4. Apparatus as in claim 3, wherein each of said end section shaping rails has a portion intermediate said portions at their ends that extends transversely of said periphery with the upper edge of said intermediate portion extending in a straight line.

5. Apparatus for bending glass sheets to complex curvature comprising a peripheral type mold including a sectionalized shaping surface consisting of a main mold section and an end mold section movably joined to an end of said main section, said end section being movable from an open position wherein said mold supports a flat glass sheet thereon to a closed position in which the bent sheet is received on all said mold sections, said main section including a pair of spaced, opposed shaping rails curved in elevation and plan to conform with the shape desired for the opposite longitudinal side edges of the main portion of said bent sheet, said end mold section also including a shaping rail comprising an intermediate portion extending obliquely of the mold and a pair of end portions extending longitudinally inward from the opposite ends of the intermediate portion with the uppermost portion of said rail along a substantial portion of the rail length forming a straight line of support lying in a substantially horizontal plane when said mold sections are in the open mold position.

6. Apparatus for bending glass sheets to a complex curvature having a maximum depth of bend D, said apparatus comprising a center mold section and a pair of end mold sections movably joined to the opposite ends of said center mold section, said end mold sections being movable from an open mold position wherein a flat glass sheet is supported thereon to a closed position wherein the bent sheet is received on all said sections, said center section including a pair of spaced opposed shaping rails concavely curved in elevation and curved in plan to correspond to the outline of the center portion of the opposite longitudinal side edges of said glass sheet, each end section including a shaping rail of concave elevation and generally U-shaped in plan, the straight line distance between the outermost portions of the upper surfaces of the end section shaping rails in the open mold position being equal to the curved length of the mold between said outermost portions of said upper surfaces of said end section shaping rails when said outermost portions occupy a plane whose vertical distance above the lowermost portion of the upper surfaces of said center section shaping rails does not exceed $D/4$, whereby a glass sheet supported for bending sags a maximum distance not exceeding 25% of the depth of bend to which the glass sheet is subjected.

References Cited by the Examiner
UNITED STATES PATENTS

| | | | |
|---|---|---|---|
| 3,088,300 | 5/1963 | Elliott | 65—288 |
| 3,186,821 | 6/1965 | Carson et al. | 65—288 |
| 3,192,029 | 6/1965 | Black | 65—291 X |

DONALL H. SYLVESTER, *Primary Examiner.*

A. D. KELLOGG, *Assistant Examiner.*